Oct. 11, 1960 A. R. KOELLE 2,956,228
PEAK READING VACUUM TUBE VOLTMETER CIRCUIT
Filed July 13, 1959 2 Sheets-Sheet 1

*INVENTOR.*
ALFRED R. KOELLE
BY
Harry M. Saragovitz
*ATTORNEY*

*INVENTOR*
ALFRED R. KOELLE
BY
Harry M. Saragovitz
*ATTORNEY*

United States Patent Office 2,956,228
Patented Oct. 11, 1960

2,956,228

PEAK READING VACUUM TUBE VOLTMETER CIRCUIT

Alfred R. Koelle, 2952 Woodland Road,
Los Alamos, N. Mex.

Filed July 13, 1959, Ser. No. 827,418

4 Claims. (Cl. 324—102)

(Granted under Title 35, U.S. Code (1952), sec. 266)

The invention described herein may be manufactured and used by or for the Government for governmental purposes, without the payment of any royalty thereon.

This application is a continuation-in-part of S.N. 586,333, filed May 21, 1956, now abandoned.

This invention relates to voltmeters and particularly to alternating current voltmeters of the peak reading type. More particularly this invention relates to a peak reading alternating current voltmeter which compensates for nonlinearities in its peak detecting diode detector characteristic.

More particularly this invention relates to a device for measuring the peak value of repeated pulses of the same peak amplitude at a repetition rate and amplitude above some minimum value for which the circuit is designed.

Peak detecting voltmeters are well known in the art and usually consist of a diode connected in series with a source of alternating voltage and a condenser-resistor combination having a long decay time to retain the peak voltage readings which may then be applied to a meter. Alternatively the diode may be connected in shunt with the meter to detect one polarity of an alternating current fed through a condenser. The first case is what may be considered a series diode circuit and the second case would be a shunt diode circuit. In each case the diode and condenser are in series across the input, but the diode may be in series or shunt with the output resistor and meter. In both cases the meter would probably be replaced by the input to a vacuum tube voltmeter which has the extremely high input impedance necessary to retain the long time constant of the resistor-condenser combination. The prior art has long recognized the difficulties of obtaining peak signal readings for pulses with low repetition rates and much has been written on the solution to this problem through long time constant circuits.

Many circuits have been designed for the measurement of pulses of short widths and slow repetition rate. However, relatively little attention has been paid to the errors within the diodes themselves or introduced by the diodes although the problem has been handled in the comparatively difficult case of a diode detection of sine waves.

The errors encountered in vacuum tube voltmeters aside from the immediate problem of establishing long time constants may stem from the fact that the pulses are not of constant shape nor density. A wide flat-topped pulse would give the optimum peak voltage value while sine waves with rounded peaks or other pulses with narrow tops or more sharply articulated peaks would scarcely realize enough peak energy to provide an accurate reading. Some meter scale correction may be introduced into a peak reading voltmeter but since the types of pulses being measured may not be constant only approximate results are usually obtained.

A plausible and prevalent source of error in working with diode circuits arises from the erroneous assumption that once the current in a diode is quite small a further decrease in the current will not be accompanied by a significant change in plate voltage. One reason for this error is that the diode characteristic curves found in tube handbooks are not intended to give information about the low current portion of the tube characteristics. The manufacturers are interested in showing how much current their diode will pass at moderately high voltages and not the nonlinear and often poorly understood behavior of the diodes at low current.

It is therefore an object of this invention to provide a peak reading voltmeter that will correct for the variations in peak reading due to relatively long time intervals between pulses compared to the pulse length.

It is a further object of this invention to provide a peak reading voltmeter that will correct for the variations in readings between various types and shapes of pulses.

It is a further object of this invention to provide a peak reading voltmeter that is insensitive to changes in tube parameters and circuit supplies.

It is a further object of this invention to provide a peak reading voltmeter having a substantially linear scalar response.

It is a further object of this invention to provide a peak reading voltmeter that will have negligible drift after initial warm up period.

It is a further object of this invention to provide a peak reading detector circuit having time constants that can be changed without upsetting the indicator zero settings.

Other and further objects of this invention will become apparent from the following specification and drawings, in which Fig. 1 shows the basic circuit for detecting peak voltage readings;

Figure 1:
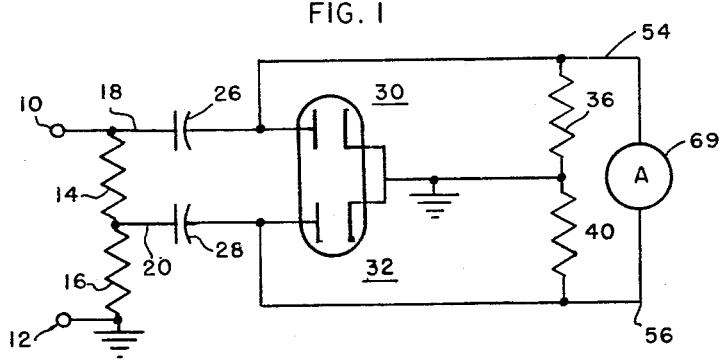

Referring now more particularly to Fig. 1 the input terminal 10 and the ground terminal 12 are connected across the voltage divider resistors 14 and 16 to provide a constant ratio of input signals with respect to ground at points 18 and 20. Since shunt diode detection is used, the coupling and storage condensers 26 and 28 apply the proportionate input wave forms to diodes 30 and 32 connected across unusually high resistors 36 and 40 respectively. The detector outputs appear across the output terminals 54—56 as a differential voltage which may be applied to meter 69.

In this circuit, portions of the input voltage are applied in some specific and fixed voltage ratio across two identical diode peak voltage detecting circuits whose outputs have a predetermined relation to their respective inputs. However, as will be explained below, the output voltages of the two circuits then provide a differential voltage proportional to the input. The actual errors in each of the component detected voltages which are due to wave shape, pulse repetition, duty cycle, diode characteristics, and other factors are of substantially the same absolute magnitude in both diodes and these errors cancel out in the differential connection. The remaining D.C. voltage output of the differential circuit may be applied across the meter or, as is more customary, across the input of a vacuum tube voltmeter. The meter will thus read a true output value undistorted by duty cycle and diode errors within the ranges of electrical response of the diodes specified below.

Figure 2:
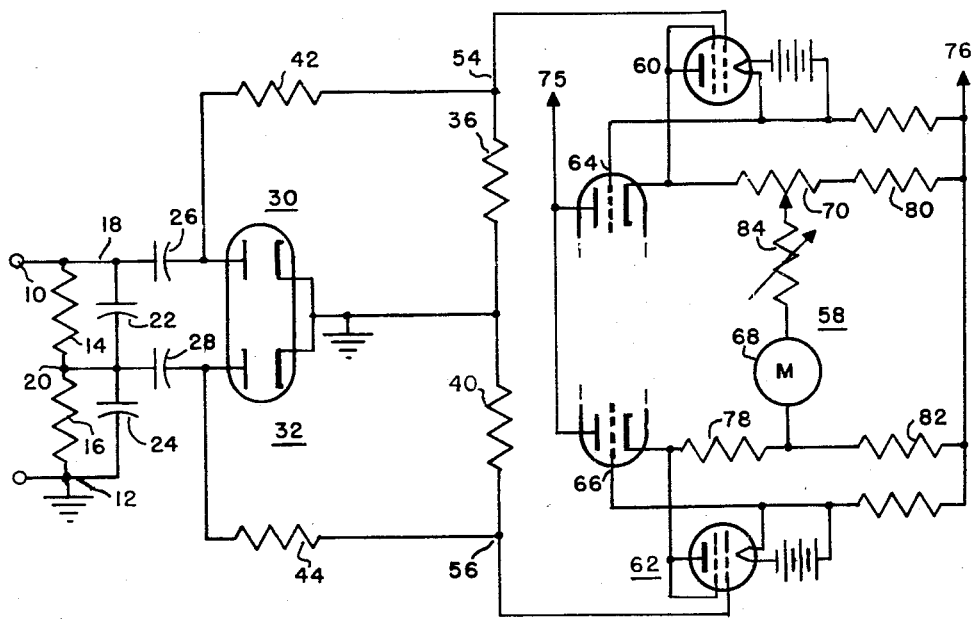
Fig. 2 shows a preferred embodiment of this device coupled to a vacuum tube voltmeter.

Fig. 2 shows a typical circuit having an input terminal 10 which is adapted to receive a voltage to measure its value with respect to ground 12. The voltage is divided between resistors 14 and 16 to provide a given ratio of input voltage with respect to ground at the points 18 and 20. The resistors 14 and 16 may be shunted by condensers 22 and 24 respectively, which function as a capacity compensating network for the voltage divider. Their values are chosen to provide the same overall ratio of voltage division as resistors 14 and 16. A purely resistive voltage divider would not work well at high frequencies because of the shunt capacity of diode 32. The two signals of the proportion established by the voltage divider network 14 and 16 are again applied through condensers 26 and 28 to the corresponding diodes 30 and 32 respectively.

The diodes are connected in a standard shunt arrangement to establish D.C. output voltages in a predetermined relation to the strength of incoming pulses. The condenser 26 is connected in series with the diode 30 while the resistor 36 is connected, through resistor 42, in parallel with the diode 30. The condenser 28 is connected in series with the diode 32 while the resistor 40 is connected, through resistor 44, in parallel with the diode 32. Resistors 42 and 44 are of negligible value compared with resistors 36 and 40, which establish the time constants of the circuits in connection with capacitors 26 and 28 as will be explained later.

The D.C. voltages appear across resistors 36 and 40 as a differential output voltage at points 54 and 56. This differential output voltage can be measured directly, or in order to maintain the highest possible input impedance with commonly available apparatus, may be applied at the input of a vacuum tube voltmeter such as that illustrated at 58 of Fig. 2. In the vacuum tube voltmeter the input voltages are applied directly to the grids of a pair of electrometer type differential amplifier tubes 60 and 62 which in turn have their anode-cathode circuits direct coupled across the grid-cathode inputs of tubes 64 and 66. The cathode circuits of tubes 64 and 66 include the sensitive ammeter 68.

At zero differential voltage the meter 68 is adjusted to read zero current by a suitable adjustment of a variable slider on the resistor 70 in the cathode circuit of tube 64. Then any differential voltage applied across the inputs of tubes 60 and 62 will cause a change in the potential levels of the cathode circuits of tubes 64 and 66 which will produce a measurable current through the meter 68.

Since the diode detection will always be of one polarity and the potential of point 54 will always be equal to or greater than that at point 56, the ammeter 68 circuit may be connected so that the potential at one point must always be positive with respect to the other. A vacuum tube voltmeter of the type described retains the highest possible input impedance to cause the minimum load across the peak detecting networks 54, 56.

Figs. 3 to 6 are shown to more clearly describe the functioning of this circuit and the principles on which its operation is based.

Figure 3:
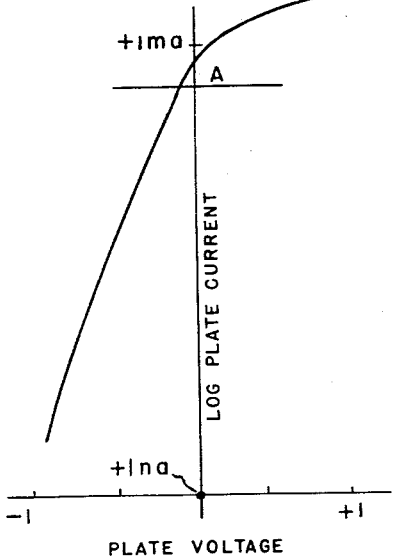
Fig. 3 shows typical vacuum diode plate current characteristics at low voltages.

Fig. 3 shows on a logarithmic scale the plate current of a typical vacuum diode plotted against the plate voltage applied to the diode. A single peak detector using a high vacuum diode rectifier such as one half of a 6AL5 diode will have the approximate curve of diode current for a given applied voltage shown in Fig. 3. This curve is for very low applied voltages and is not usually shown in the manufacturer's curve of diode characteristics.

The increase in current with respect to applied voltage is actually exponential at low voltage values. This would be readily apparent if the relationship were plotted in a linear manner. The curve of Fig. 3 has, however, been plotted to a logarithmic current scale to expand the graph and allow ready interpretation thereof at low voltage values. The curve of the logarithmic plot is a straight line below a current value of about one half milliampere and has a slope of about .22 volt on the horizontal axis per decade change of current. This plot illustrates the characteristics observable in a conventional thermionic diode such as one half of the commercially available 6AL5 type.

The exponential characteristics of the low current portion of the diode current-voltage curve is not accidental but is a fundamental phenomenon of all thermionic diodes. In practice the derivation of the ordinary 3/2 power law for vacuum diodes applies to the higher current capacities of the diode and neglects the initial values of current conduction due to the velocity of electrons emitted from a cathode. The electrons leave the cathode with random initial velocities distributed according to a Maxwellian probability function. The position of the peak probability for initial velocity depends on the cathode temperature. An integration of the probability function for the initial electron velocity voltage will yield an exponential current-voltage characteristic that corresponds closely with the experimentally found results. The maximum slope of the logarithmic plot of the voltage-current curve at ordinary cathode temperatures is about one decade change in current per 0.2 volt. Lowering the cathode temperature by reducing the filament current results in a decided shift to the right of the curve as the initial velocities are reduced, but the slope increases only very slightly.

Among the heater cathode type tubes the 6AL5 is probably the best choice for peak voltmeter circuits since the current-voltage slope of the 6AL5 is very close to the theoretically derived value and the characteristic has been found to be exponential from .5 milliampere all the way down to .001 microampere.

Figure 4:
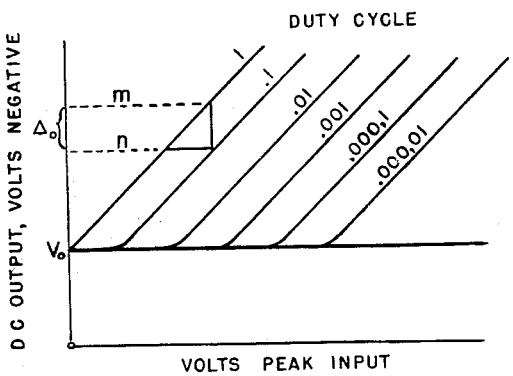
Fig. 4 shows the detector characteristics of a single peak diode for various duty cycles.

The voltage-current characteristics of the vacuum diode detector circuits used in peak voltmeter circuits explain the characteristics of the pulse duty cycle curves shown in Fig. 4 for operation within the logarithmic range. Fig. 4 shows the D.C. output voltage, for a variable peak input voltage, for unity duty cycle and successive duty cycles decreasing by a factor of 10. It is noted that the D.C. detector output voltage never drops below the value $V_0$, which is greater than zero and is established by the thermionic emission velocity, even at zero applied input voltage. The voltage $V_0$ is commonly known as the diode velocity potential and is the detector output voltage in the absence of an applied signal.

It is seen that, except for a unity duty cycle signal, where the full voltage is applied to the diode circuit at all times, the detector does not respond until a certain minimum input signal voltage is applied. The actual operation at unity duty cycle could occur only by use of a series diode circuit, which also is more readily analyzed. However, the shunt diode circuit is simpler, particularly where a compensating circuit is used, and equivalent at low duty cycles to a series circuit. The magnitude of a minimum detectable signal depends on the pulse duty cycle and is larger for smaller duty cycles. For a typical receiving type diode such as the 6AL5 the horizontal and vertical separation of the characteristic curves of Fig. 4 is about .22 volt for each 10 to 1 change in duty cycle. Thus if the duty cycle of a pulse signal applied to a single peak detector circuit operating in the logarithmic range is changed by a factor of 10 without altering the pulse peak amplitude the detector will indicate an apparent .22 volt change in peak input level. This would be the error in a single diode peak voltmeter reading for this change in duty cycle. It will be noted that the same output voltage change with duty cycle change occurs at all peak voltage signal input amplitudes above the minimum detectable input. Particular quantitative values of the characteristics are not essential as they are to be compensated as noted below. Velocity potential varies widely, particularly with cathode temperature change, but for convenience of illustration is shown at a typical value of 1.54 volts.

In the improved circuit constructed in accordance with the principles of this invention two typical receiving type diode detectors are used. One detector 30 of Figs. 1 and 2 detects the full input signal and has an output characteristic for a given pulse duty cycle as shown in curves "a" of Fig. 5. The second detector 32 of Figs. 1 and 2 detects only a portion of the input signal. This portion is derived from the fixed ratio of the voltage dividers 14—16 across the input terminals and has output characteristics relative to the full input for the same duty cycle as shown in curves "b" of Fig. 5. Since the diode circuits are alike the same output values correspond to inputs in this same (inverse) fixed ratio; that is the curves a and b differ only in such ratio of the horizontal input coordinates. The extensions of the straight portions of such curves are included to make this relation more readily apparent since extensions corresponding to the same duty cycles meet the vertical axis at the same point.

The outputs at 54 and 56 are measured or are combined in the differential amplifier of the vacuum tube voltmeter 58 of Fig. 2. The output of the differential amplifier is of course proportional to the difference shown between curves "a" and "b" of Fig. 5. Fig. 6 also shows this combined characteristic output in the curve labeled "a—b" which is the result of subtracting the output of detector 32 from that of detector 30.

It will be noted that the dotted line extension of the straight line portion of the "a—b" curve extends through the coordinate axis origin. This necessarily follows from the common intersection with the vertical axis noted above. This portion of the curve while not physically attainable at less than unity duty cycles shows that the characteristic of the combined outputs where each output is slightly above the velocity potential (but within the logarithmic range of diode operation) is independent of the pulse duty cycle and provides a hitherto unavailable linearity for this device regardless of changes in duty cycle.

Figure 5:
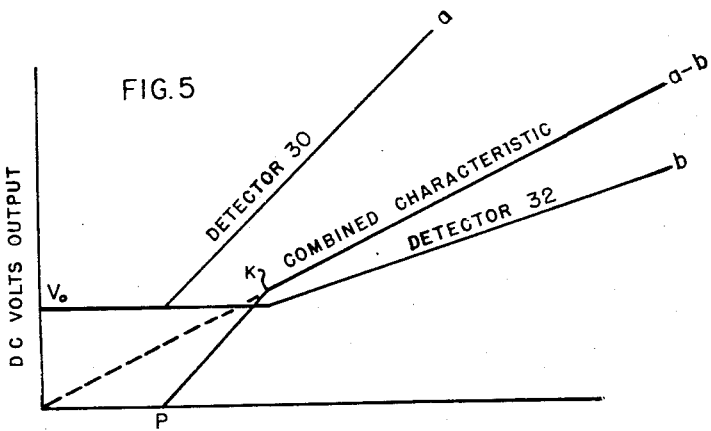
Fig. 5 shows the individual diode detector characteristics for two values of duty cycle.
Figure 6:
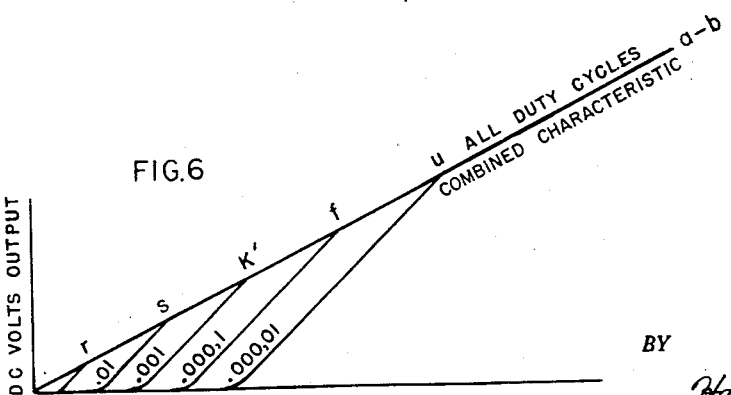
Fig. 6 shows the combined detector characteristics for various duty cycles, including those of Fig. 5.

The curve "a" of Fig. 5 corresponds exactly with one of the duty cycle curves of Fig. 4 and the curve "b" of Fig. 5 would be the output of a similar diode at the same duty cycle but with the input voltage divided to the fraction established by the resistors 14 and 16 of Figs. 1 and 2. A separate curve representing the characteristics of detector 32 or curve "b" could be drawn to correspond to each of the curves representing a different duty cycle seen in Fig. 4. The primary effect of a change in pulse duty cycle is to shift the position of the minimum linear value of the curves as they are taken from Fig. 4 since the combined characteristic would remain constant above the knee "k" of the combined characteristic curve "a—b".

The slope of each "b" curve will be constant dependent on the voltage divider ratio and its position with respect to its corresponding "a" curve for the same duty cycle will be such that extensions of both curves meet the vertical axis at the same point; therefore the resultant "a—b" curve coincides with the family of "a—b" curves, as shown in Fig. 6, for all values within the appropriate range above identified of the diodes. This factor is basic to the combined characteristic curves of all duty cycles having the same position in the useful regions of the detector response curve.

It is obvious from this graphic analysis of the operation of the voltmeter that this voltmeter has a substantially constant output-input reading, regardless of the duty cycle, between the maximum and a certain minimum voltage which will presently be defined. A conventional single diode peak reading voltmeter on the other hand will have a similar limitation of minimum voltage reading and even if operated in the logarithmic range will have the .22 volt error in D.C. output reading for each decade change in the duty cycle factor as shown between the lines "m" and "n" of Fig. 4.

Since both diodes of detectors A and B reach the same minimum voltage $V_0$ shown in Fig. 5 the actual meter reading drops off to zero at point "p" of the combined characteristic curve for a 0.001 duty cycle which is the point where equal values are subtracted. The position of the minimum peak voltage reading varies according to the duty cycle.

The combined detector characteristics for the various duty cycles are shown in Fig. 6. This is the combined characteristic curve "a—b" shown in solid lines as derived from Fig. 5 with the change in low input readings for all the fractional duty cycles shown also in dash lines. One knee of the curve "a—b" of Fig. 6, for example, "k" might correspond to the point "k" of Fig. 5 while other knees "r," "s," "t," and "u" would correspond to others of the various duty cycles shown in Fig. 4. Dotted reference lines have been included to show the relation between Figs. 5 and 6 and line "a—b" has been shown particularly heavy at the right to emphasize that this portion applies to a wider range of duty cycles.

The extension of the linear part of the combined characteristic curve goes through the origin and therefore the output voltage reading is linear with respect to the no signal zero setting of the output indicator for all duty cycles and all peak voltage values above the corresponding knee of the combined characteristic curve.

In operation the input signal is applied across the terminal 10 and ground 12 of the Figs. 1 and 2. The input signal may be any type of pulse or alternating wave, either continuous or modulated, within the minimum pulse duty cycle. Direct current of the correct polarity could also be measured by substituting series detectors in a well-known manner. In this case the entire combined characteristic would actually exist down to the origin.

The input wave form is applied across the voltage divider 14—16 which may be of any desired ratio although a compromise of about 50% used here is probably desirable. As the voltage dividing point 20 approaches ground potential the circuit has considerably less usable range for low duty cycles, since the compensating diode does not conduct at low inputs, and the circuit, because of the main diode, eventually becomes a purely conventional peak reading voltmeter with all its inherent sources of error. Altho there is no specific lower limit to the voltage divider ratio it would ordinarily be near or above 50% and the portion of the divider applied to the compensating detector is therefore referred to as a major portion. As the voltage dividing point 20 approaches the full value of the input at 18 the usable range increases somewhat, but this cannot be carried too far, as the differential is decreased providing less and less measurable signal across the output, ultimately limiting the sensitivity and stability of the device.

The voltage divider 14—16 is shown as a resistive network in Fig. 1 and with a parallel capacitive network in Fig. 2. It will be obvious to anyone skilled in the art that any resistive, capacitive or inductive voltage divider would be usable here, within the teachings of this invention, as long as the signal appearing at 20 is a true image of the input signal, at the proportionately reduced voltage, and is synchronized with the input signal.

The full AC input signal is applied through the blocking and storage condenser 26 across the diode 30. The resistance 36 is provided to discharge the storage condenser 26 to establish the time constant of the storage circuit to a practical value.

The fixed proportion of the input signal at 20 is applied through blocking condenser 28 across the diode 32 which is similarly shunted by a resistor 40. The detectors, storage condensers and their associated resistors would ordinarily be identical in each path to preserve the linearity of response and to duplicate as much as possible the errors in both paths so that these errors will be effectively cancelled across the differential output 54—56. The overall output will be the fraction of the input voltage determined by the voltage divider 14—16 and will be proportional to the input voltage within the operating limits of the diodes. It will be noted that the output fraction is based on a difference between the divider ratio for diode 30, normally unity, and that for diode 32, such as ½ (as noted above) or ⅔; the output therefore might be (1—½)=½, (1—⅔)=⅓, or other value.

The differential voltage across 54—56 may be measured by a suitable meter and a simple meter 69 is shown in Fig. 1. However, in practice the meter must have such a high input impedance that its effect is negligible across the detecting circuit; therefore, a vacuum tube voltmeter differential measuring circuit such as 59 shown in Fig. 2 would normally be employed. Such vacuum tube voltmeter techniques are well known in the art and other forms exist, both simpler and more complex, which would be applicable here. The differential inputs are usually applied to the grid or grids of vacuum tubes such as 60 and 62 whose output may be further amplified or decoupled or both to increase the effective gain or impedance or both as in 64 and 66. This high impedance input is translated to the relatively low output impedance across the cathodes of tubes 64 and 66 to supply the relatively high current and power required to drive the meter 68 without loading the differential circuit.

The circuits shown in Figs. 1 and 2 have shunt detectors but series detectors or other forms well known in the art may also be used.

The RC product of resistor 36 and condenser 26 is chosen to be several times the value of the maximum time spacing between adjacent pulses which avoids substantial change in output voltage during intervals between pulses. In view of the unusually high resistance, even with a rather small condenser the time constant would be considerably longer than needed for any ordinary pulse spacing. A related but not identical factor is the duty cycle which may be defined as the pulse width over the pulse period. When duty cycle is particularly low additional care is required that the diode potential and current remain in the logarithmic range; this is largely dependent on the resistor alone whereas the time constant is dependent on the condenser also. A substantial change in voltage during pulse intervals would confuse the analysis by superposing a logarithmic current-time relation on the logarithmic voltage-current relation.

The value of resistance of both 36 and 40 is chosen to allow the diodes to operate within the straight line portion of the logarithmic plate characteristic seen in Fig. 3. If I is the largest plate current for which diode conduction is logarithmic, D is the minimum pulse duty cycle, and V is the maximum output voltage from the diode circuit, then the minimum allowable resistance R is given by the formula $$R = \frac{V}{ID}$$

In the typical circuit shown in Fig. 2 the values of resistances 36 and 40 may be of the order of 20,000 megohms. The storage condensers 26 and 28 may have the relatively low value of 47 micromicrofarads in view of this unusually high resistance for pulse spacings up to 0.1 second. The high resistance may be realized through specially made resistors and provides proper operation if the voltmeter uses certain types of tubes designed for this purpose.

The resistances 42 and 44 of Fig. 2 decouple the input high frequencies from the vacuum tube voltmeter and may have a value of 10,000 ohms, which is negligible compared with the values of resistors 36 and 40 in the storage circuit.

The values of the resistors 14 and 16 of the voltage dividing network across the input are both 5,600 ohms and the value of the condenser 22 is 10 micromicrofarads.

The value of condenser 24 is only 8 micromicrofarads to compensate for the 2 micromicrofarads shunt capacitance in diode 32. The value of the variable resistor 70 is 5,000 ohms. The value of resistor 78 is 2,700 ohms, 80 is 150,000 ohms, 82 is 150,000 ohms and 84 is 150,000 ohms. The voltage supply at 75 is plus 150 volts with respect to ground at 6 milliamperes and the voltage supply at 76 is minus 150 volts with respect to ground at 6 milliamperes. The tubes 60 and 62 are of the type 5886, commonly known as electrometer tubes because of low grid current. The tube elements 64 and 66 comprise the halves of a dual triode 12AU7 and the tube elements 30 and 32 comprise the halves of a dual diode 6AL5. Suitable filament voltages should, of course, be provided for each tube.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wide duty-cycle range linear reading peak voltage measuring device comprising substantially equivalent first and second peak voltage detecting means each having an input and an output, an alternating current voltage divider means connected across the applied input voltage of said first peak voltage detecting means, the input of said second peak voltage detecting means being connected across a major portion of said voltage divider means, and a voltage measuring means connected across the outputs of said first and second peak voltage detecting means in opposition, each said diode voltage detecting means comprising: a diode having substantially logarithmic voltage-current characteristics at low diode inputs, and a very high resistance diode load in the order of thousands of megohms to assure such logarithmic diode operation at such low diode inputs through a wide range of duty cycles and applied input voltages, whereby an output measurement is provided through such range of both detecting devices substantially linearly corresponding to the applied input peak voltage but independent of variations in duty cycle.

2. A wide duty-cycle range linear reading peak voltage measuring device comprising substantially equivalent first and second peak voltage detecting means each having an input and an output, an alternating current voltage divider means connected across the applied input voltage of said first peak voltage detecting means, the input of said second peak voltage detecting means being connected across a major portion of said voltage divider means, and a voltage measuring means connected across the outputs of said first and second peak voltage detecting means in opposition, each said diode voltage detecting means comprising: a thermionic diode having substantially logarithmic voltage-current characteristics at low diode inputs, and a very high resistance diode load in the order of thousands of megohms to assure such logarithmic diode operation at such low diode inputs through a wide range of duty cycles and applied input voltages, whereby an output measurement is provided through such range of both detecting devices substantially linearly corresponding to the applied input peak voltage but independent of variations in duty cycle.

3. A wide duty-cycle range linear reading pulse peak voltage measuring device comprising substantially equivalent first and second diode and condenser storage type voltage detecting means each having an input and an output, an alternating current voltage divider means connected across the applied input voltage of said first voltage detecting means, the input of said second voltage detecting means being connected across a major portion of said voltage divider means, and a voltage measuring means connected across the outputs of said first and second voltage detecting means in opposition, each said diode voltage detecting means comprising: a diode having substantially logarithmic voltage-current characteristics at low diode inputs, and a diode load resistance in the order of thousands of megohms sufficiently high to assure diode operation at such low inputs through a wide range of duty cycles and applied input voltages, whereby an output measurement is provided through such range of both detecting means substantially proportional to the applied input peak voltage but independent of variations in duty cycle.

4. A wide duty-cycle range linear reading pulse peak voltage measuring device comprising substantially equivalent first and second diode and condenser storage type voltage detecting means each having an input and an output, an alternating current voltage divider means connected across the applied input voltage of said first voltage detecting means, the input of said second voltage detecting means being connected across a major portion of said voltage divider means, and a voltage measuring means connected across the outputs of said first and second voltage detecting means in opposition, each said diode voltage detecting means comprising: a thermionic diode having substantially logarithmic voltage-current characteristics at low diode inputs, and a diode load resistance in the order of thousands of megohms sufficiently high to assure diode operation at such low inputs through a wide range of duty cycles and applied input voltages, whereby an output measurement is provided through such range of both detecting means substantially proportional to the applied input peak voltage but independent of variations in duty cycle.

References Cited in the file of this patent

UNITED STATES PATENTS 2,511,562     Bresee _____ June 13, 1950